July 2, 1946.  A. E. DRISSNER  2,402,990
ALTERNATING CUT-OFF CHUCKING MACHINE
Filed April 18, 1941  8 Sheets-Sheet 1
Fig. 1.
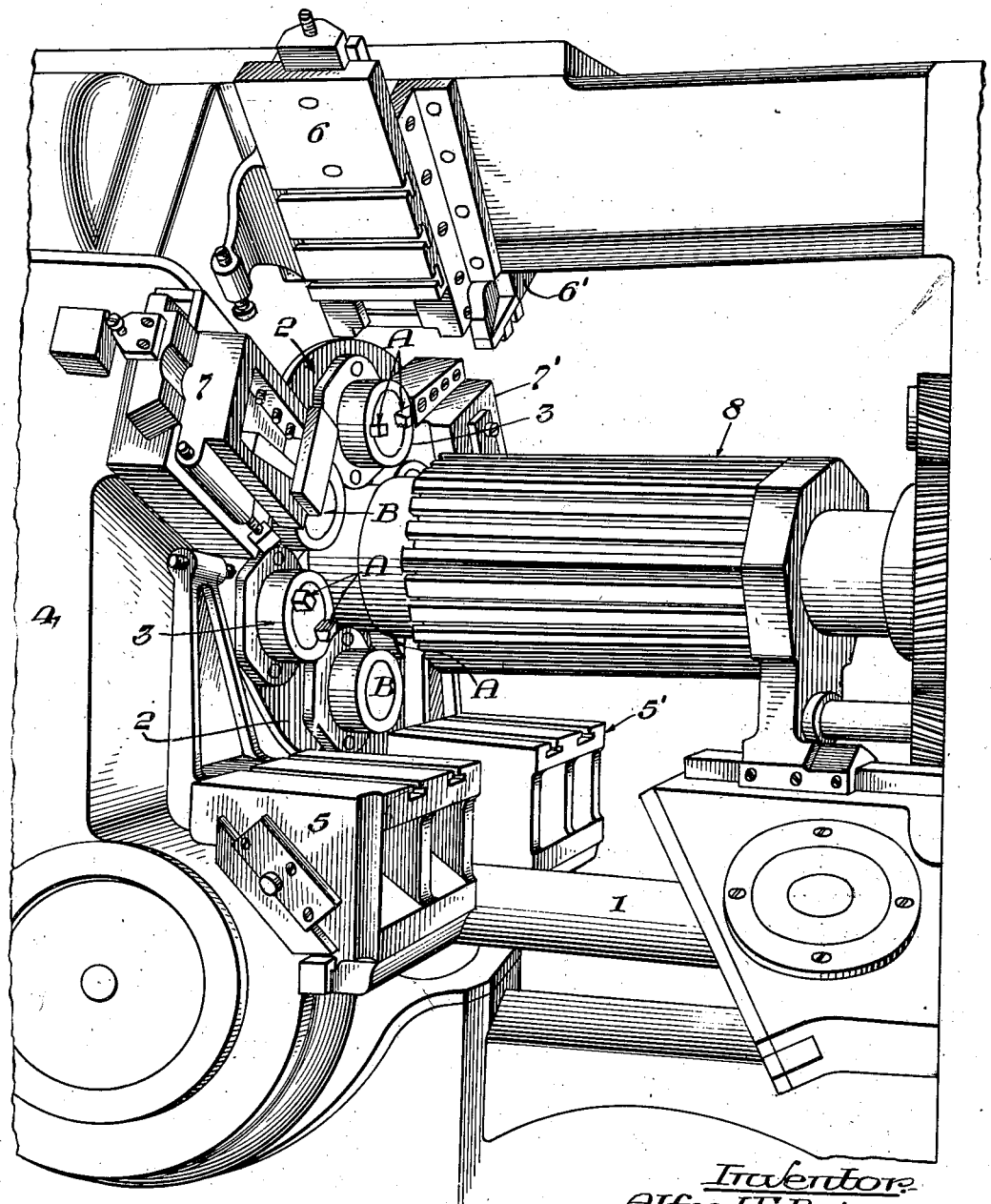
Inventor
Alfred E. Drissner
by his Attorney

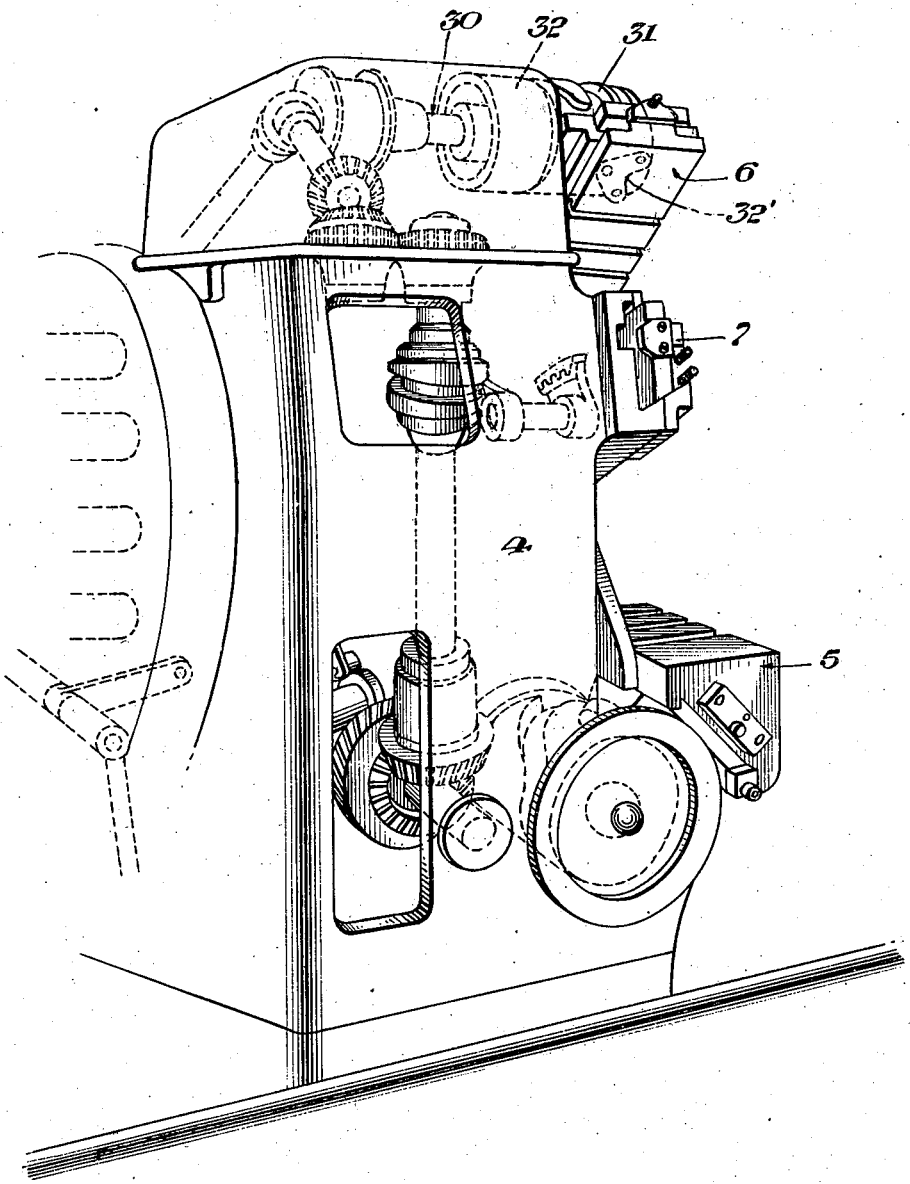

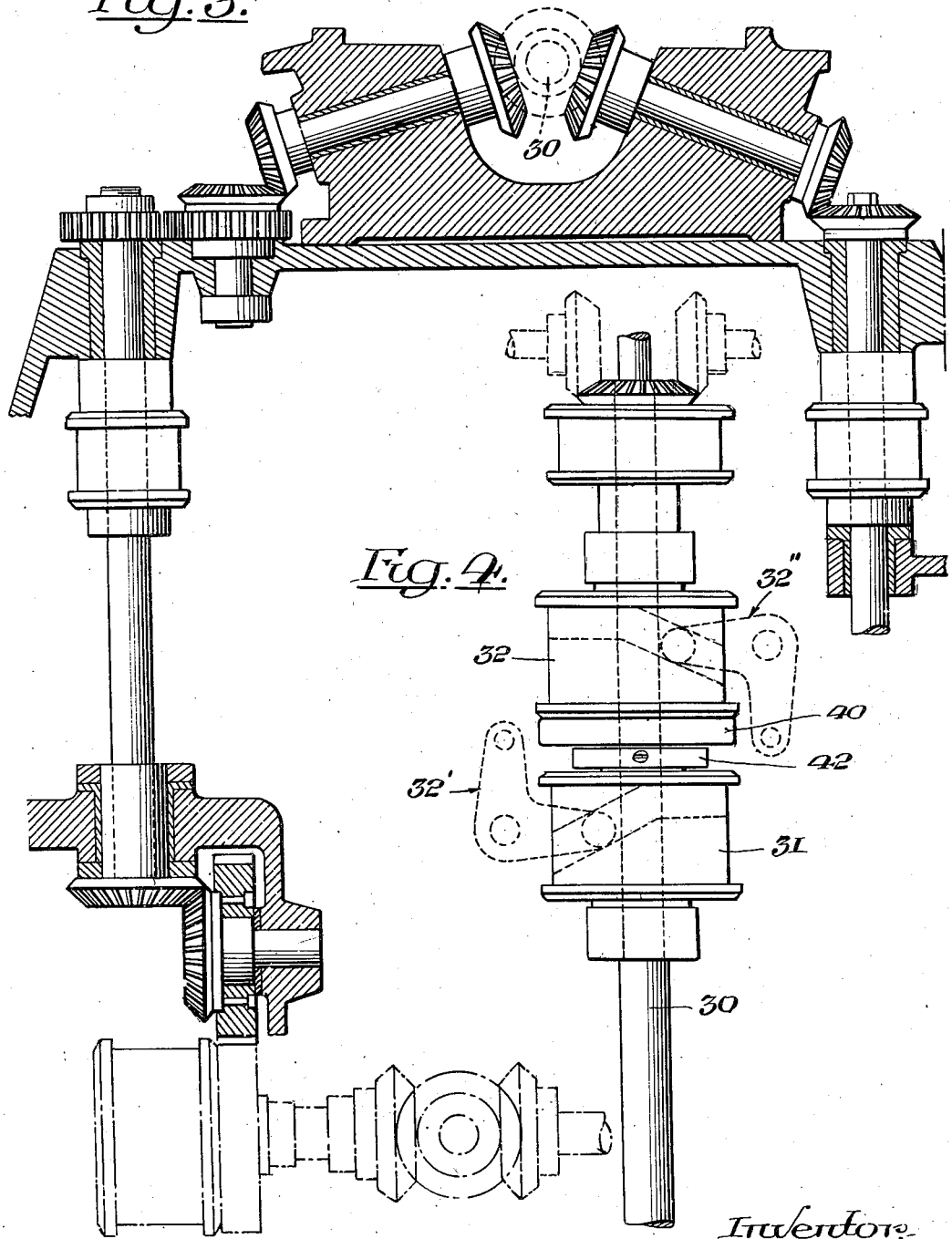

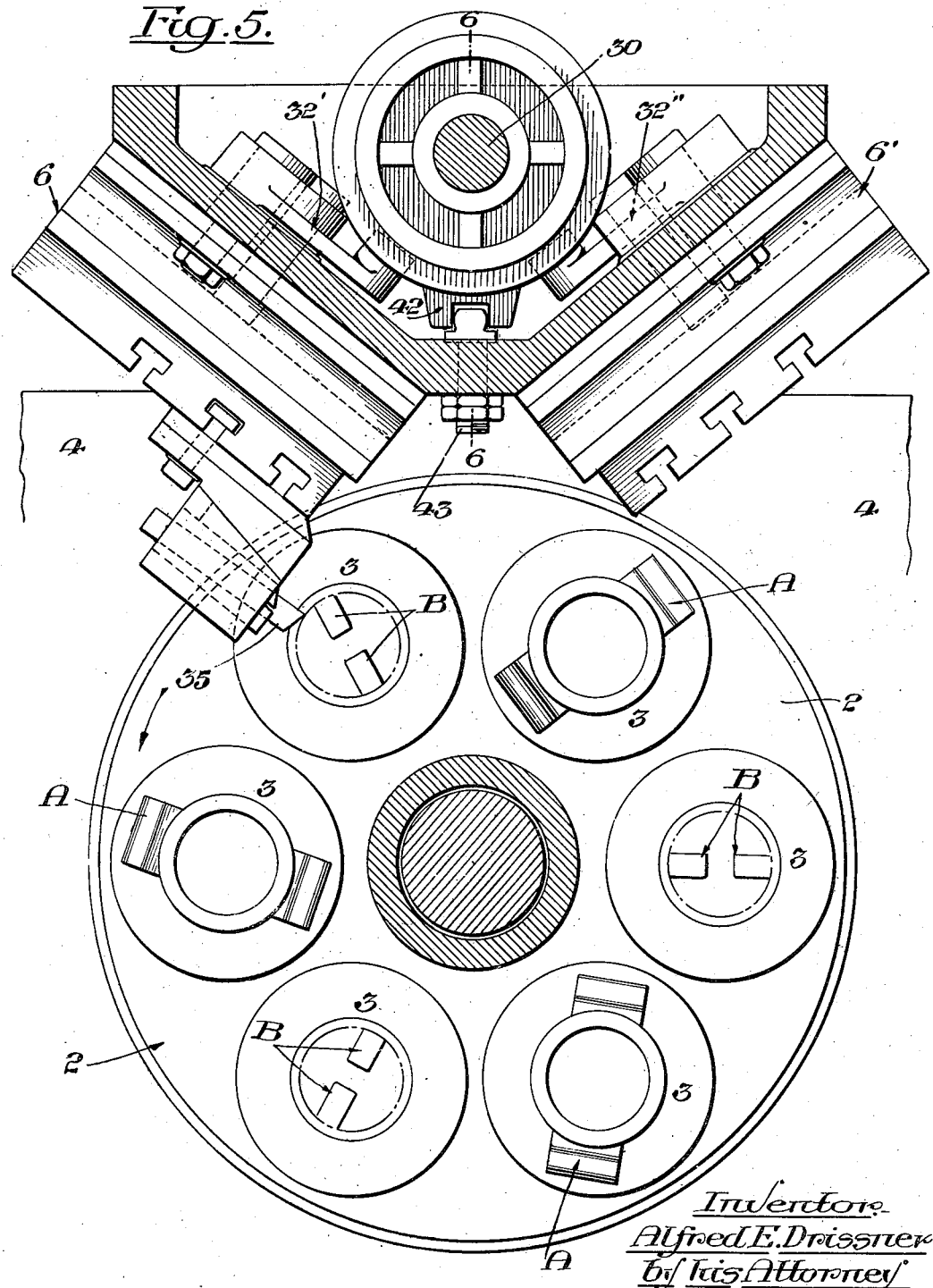

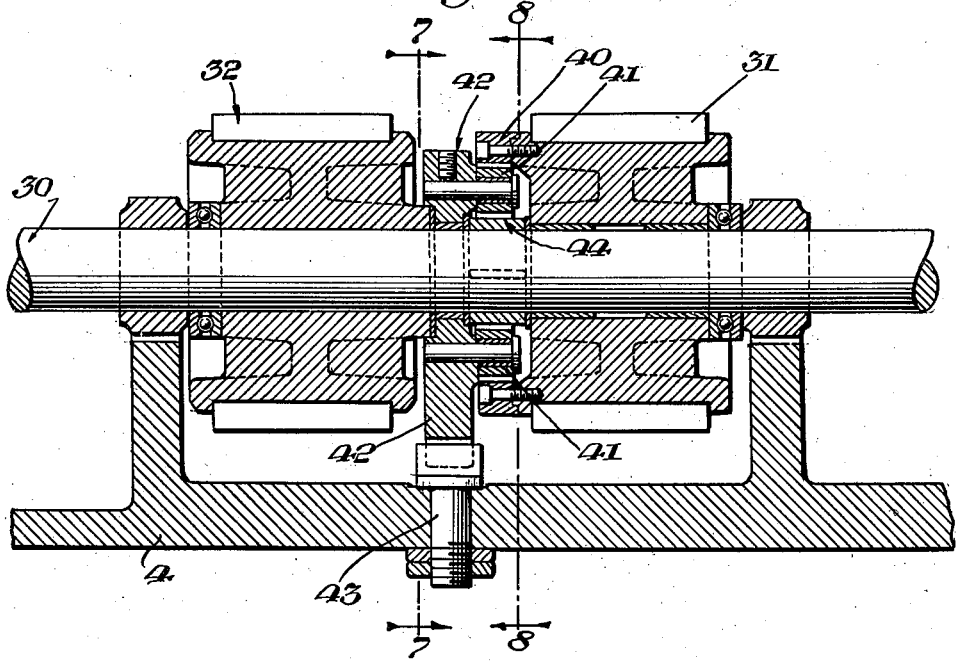
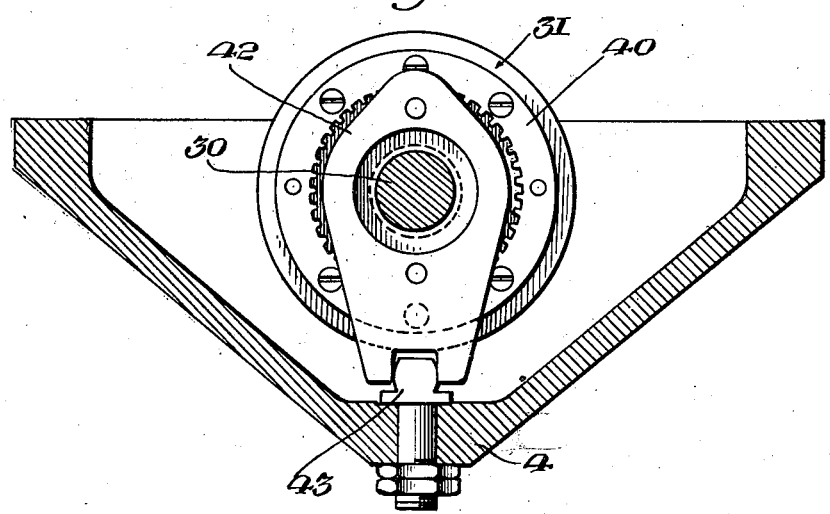

July 2, 1946.  A. E. DRISSNER  2,402,990
ALTERNATING CUT-OFF CHUCKING MACHINE
Filed April 18, 1941  8 Sheets-Sheet 7

Inventor
Alfred E. Drissner
by his Attorney

July 2, 1946.  A. E. DRISSNER  2,402,990
ALTERNATING CUT-OFF CHUCKING MACHINE
Filed April 18, 1941    8 Sheets-Sheet 8

Inventor
Alfred E. Drissner
by his Attorney

Patented July 2, 1946

2,402,990

UNITED STATES PATENT OFFICE 2,402,990

ALTERNATING CUTOFF CHUCKING MACHINE

Alfred E. Drissner, Cleveland, Ohio, assignor to The National Acme Company, Cleveland, Ohio, a corporation of Ohio Application April 18, 1941, Serial No. 389,165

21 Claims. (Cl. 29—38)

This invention relates to automatic multiple spindle machines such as chucking machines, the object of the invention being to provide an improved machine of this class and an improved method for forming a pair of articles from a single piece of substantially double-size such as, for instance, two similar or duplicate articles such as bearing rings, from a single blank or forging, in which the work will be first gripped by an external chuck of the machine to permit one-half thereof to be completely machined during the indexing movements of the spindles, and then removed, reversed and gripped by an internal chuck of the same machine to permit the unfinished half thereof also to be completely machined by the same tools that operated on the first half of the work, and upon completion of the second half and while still gripped by the internal chuck, cutting the piece in half to form two completely finished articles.

A further object of the invention is the provision of an improved chucking machine by means of which this improved method may be carried out by a six spindle machine having rotatable chuck spindles carried by an indexible spindle carrier, three of which chuck spindles are provided with internal chucks and three with external chucks located in alternation and an improved cut-off mechanism for cutting the double-length pieces of work in half to form two completely finished articles after both ends of the work have been completely operated upon, first when held by the external chucks and then by the internal chucks, the cutting-off tool operating alternately and thus providing what I have herein designated as an alternating cut-off mechanism for a multiple spindle machine such as a chucking machine.

Heretofore, it has been attempted to accomplish the machining of two similar halves of a piece of work either by a very complicated mechanism or by the use of an eight spindle machine or by utilizing opposed spindles or auxiliary spindles into which the work is shifted from one to the other or in which the piece of work is cut off before the two halves are completely finished, whereas, in the present improvement a six-spindle machine is utilized by providing it with alternately located external and internal chucks so that both halves of the work are completely machined by the same tools, one-half of the piece being finished when gripped by the external chucks and the other half finished when the piece is reversed and gripped by the internal chucks, and then when both halves are finished, the piece is cut in half by an alternating cut-off mechanism, thus providing a very much simplified and efficient chucking machine and expeditious method for completely finishing two halves or similar halves of a piece of work to form duplicate parts or articles from one double-length blank forging or casting thus doing away with the complicated mechanism and opposed or auxiliary spindles, etc., heretofore used.

In the drawings accompanying and forming a part of this specification,

Fig. 1 is a front perspective view of this improved chucking machine.

Fig. 2 is a side view thereof.

Fig. 3 is a partly sectional view illustrating the mechanism for operating the side and top cross slide tools for machining the work.

Fig. 4 is a view of the top cam drum shaft.

Fig. 5 is a cross-sectional view of the machine illustrating the alternately operative cut-off mechanism.

Fig. 6 is a sectional view taken on line 6—6 of Fig. 5 and illustrating the means for operating the alternating cut-off tool.

Fig. 7 is a cross-sectional view taken on line 7—7 of Fig. 6.

Figure 21:
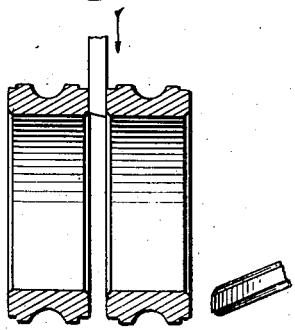

Figs. 10 to 15, inclusive, illustrate the successive operations upon one-half the work while gripped by the external chuck, and Figs. 16 to 21 illustrate the operations upon the other half of the work when reversed and gripped by the internal chuck, said Fig. 21 illustrating the piece as both halves have been completely finished and severed, to form two similar completely finished pieces.

Similar characters of reference indicate corresponding parts in the several views.

Before explaining in detail the present improvement and its mode of operation, I desire it understood that the invention is not limited to the details of construction and arrangement of parts illustrated in the accompanying drawings since the invention is capable of other embodiments, and that the phraseology employed is for the purpose of description and not of limitation.

For the purpose of carrying out the present improvement, I have utilized a multiple spindle machine somewhat similar to that shown and described in my prior Patent 2,187,683 of January 16, 1940, except that the present improved machine has only six spindles instead of eight and providing three of the spindles with external chucks and three thereof with internal chucks, alternately arranged, the cut-off mechanism being so located and operated as to provide an alternating cut-off, thereby to accomplish the desired result.

The spindle carrier 2, having six rotary spindles 3, is mounted in an upright housing 4, the machine being provided with two tool carrying lower cross slides 5 and 5' for the two lower spindles, a pair of top tool carrying cross slides 6 and 6' for the two upper spindles, and a pair of intermediate tool slides 7 and 7' for the other two or intermediate spindles, suitable mechanism being provided for operating these slides either together or independently, as may be desired.

In the present instance, the bottom and intermediate cross slides are operated from a lower cam shaft 1 while the two top cross slides are operated from a top cam shaft 30 by mechanism substantially similar to that shown and described in the patent referred to. Therefore, a further description thereof is deemed unnecessary. The machine is also provided with a main tool carrier or slide 8 for supporting the end working tools and which is supported and operated in the manner shown and described in said patent.

Figure 10:
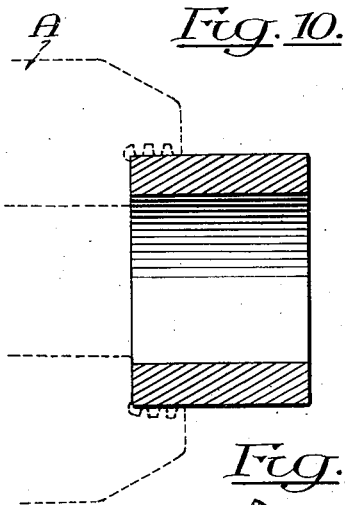

In the operation of the machine, a casting or forging of a length suitable to form a pair of articles such as duplicate articles, that is, of double length, is chucked by an external chuck, as A, Fig. 10, in the first or loading position (see Fig. 5) and during the successive indexings of the spindle carrier, one-half of the piece is machined to form one complete article by the end working tools carried by the main tool slide 8 and the side working tools carried by the cross or side slides 5, 6, 7, etc., as illustrated in Figs. 10 to 15. When each piece again reaches the loading position, it is removed, reversed and gripped by an internal chuck so that the opposite end, during the successive indexing thereof is also machined and finished by the same end and side working tools. When both halves have thus been completely machined, the piece is cut in half by the means hereinafter described.

Figure 16:
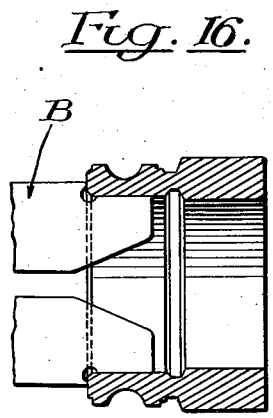
Figure 11:
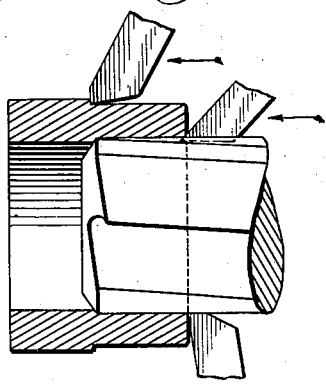
Figure 17:
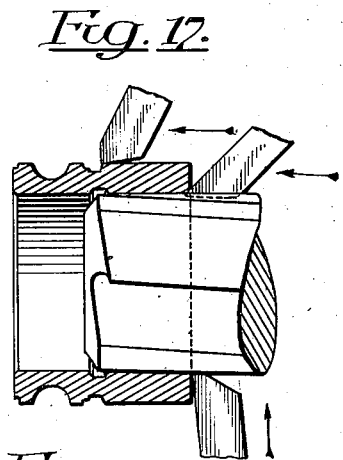
Figure 12:
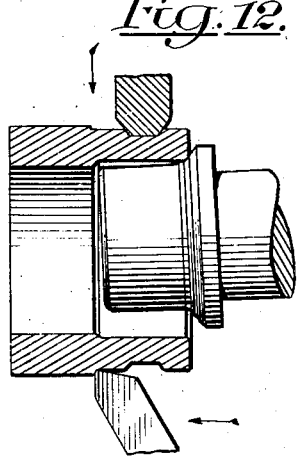
Figure 18:
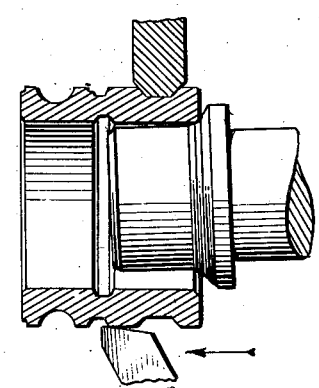
Figure 13:
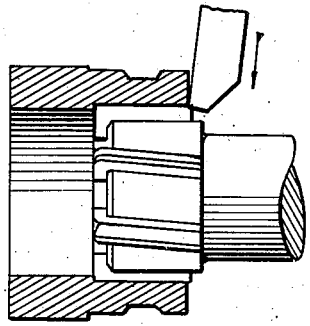
Figure 19:
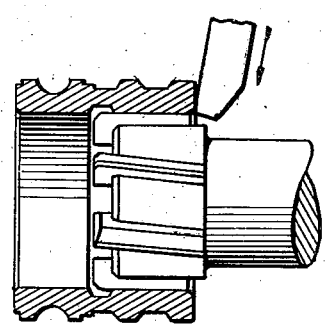
Figure 14:
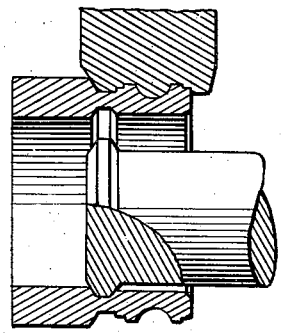
Figure 20:
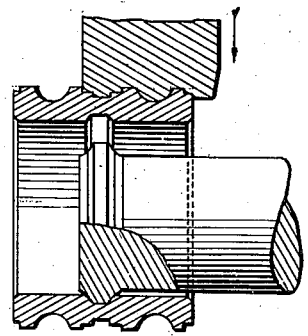
Figure 15:
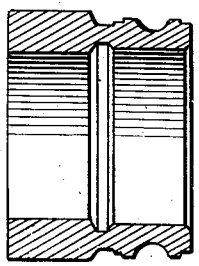

Thus, when each piece, gripped by an external chuck, is indexed to the first or loading position, it is then removed, reversed and gripped internally by the next succeeding chuck, which is an internal chuck, as B, Fig. 16. At the same time a new unmachined double-length piece is inserted in the idle external chuck, as A, while in its loading position and since the external and internal chucks are alternately arranged, the other or inner half of the piece is likewise completely machined by the same tools during the successive indexing of the spindle carrier, as illustrated in Figs. 11 to 21, and as each of the three internal chucks B reaches what is termed the sixth position and before reaching the loading position, a piece is cut in half by the alternately operating cut-off mechanism, thus forming thereafter a completely finished piece at each indexing of the spindle carrier from station to station.

Therefore, during each cycle of the cam shaft 1 or a complete indexing of the spindle carrier, six pieces of work, three carried by the external chucks are having their ends machined, and three carried by the internal chucks are also having their ends—opposite to the previously machined ends—machined by the same tools and after both ends of the piece have thus been machined, the piece is cut in half.

Since the cut-off mechanism operates only after a piece has been completely machined on both ends and therefore while carried only by the internal chuck, this cut-off mechanism has been termed, as before stated, an alternating cut-off means.

Figure 8:
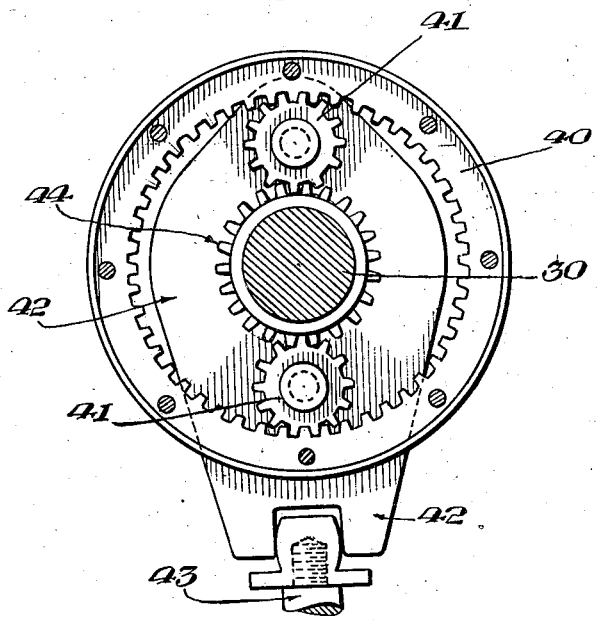
Fig. 8 is a cross-sectional view taken on line 8—8 of Fig. 6.
Figure 9:
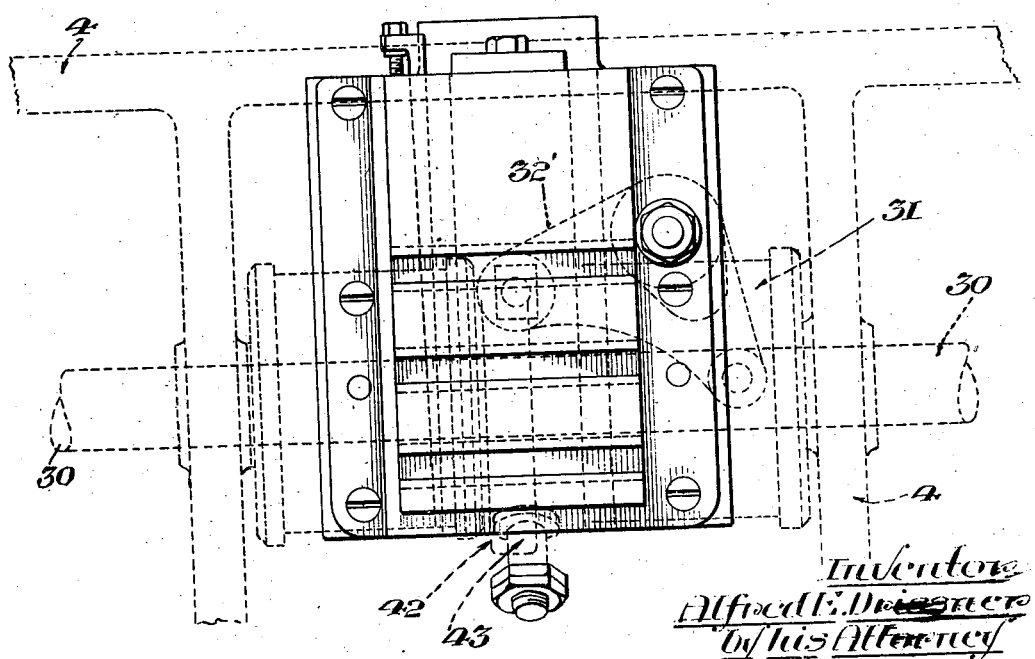
Fig. 9 is an under side or face view of the cut-off tool slide shown at the left in Fig. 5.

The cut-off tool is shown located at the top left hand slide of Fig. 5, or what is termed the sixth position. For the purpose of operating this cut-off tool in this alternate manner, the top cam shaft 30 shown, for instance, in Fig. 4, carries a pair of cam drums 31 and 32 and, in this instance, the cam drum 31, instead of being fixed to the cam shaft, is loosely mounted thereon. These cam drums, by means of angle levers 32' and 32'' operate the two top slides 6 and 6', the slide 6 carrying the cut-off tool 35. For operating this cut-off tool in proper timed sequence, the slide operating cam drum 31 (see Figs. 6, 7 and 8) is provided with an internal gear 40 fixed thereto and meshes with a pair of idler gears 41 carried by a normally fixed bracket 42, being prevented from rotating with the cam shaft by means of an adjustable or detachable stud 43. These idler gears mesh with an external gear 44 fixed to the cam shaft to rotate therewith and thus, as the cam shaft rotates, the idler gears rotate the cam drum 31 through the internal gear 40 of that drum and as the cam shaft rotates one revolution during the cycle of the machine, the cam drum will only revolve one-half a revolution and as this cam drum 31 is provided with suitable cams to operate the cut-off slide forward and backward, it follows that the cut-off tool is shifted into cut-off position, not at each indexing of the spindle carrier as is usual but only at each alternate indexing thereof. In practice, the cam drum is provided with a guide cam alternately to hold the cut-off slide in its idle or inoperative position. When it is desired to change the machine to a normal chucking machine where this alternating cut-off mechanism is not required, all that is necessary is to shift or remove the locking bolt 43 and permit the cam drum 31 to rotate with its cam shaft 30 and for which purpose the cam drum is then fixed to the cam shaft 30.

Thus, by the present improvement, I have provided a very much simplified machine and method for completely machining two halves of a piece of work on a six spindle machine in which each piece is carried by an external chuck during the complete formation of one-half thereof and then reversed and carried by an internal chuck during the complete formation of the other half of the piece of work, the chucks being alternately arranged in the same spindle carrier so that both halves of the work are operated upon by the same tools, the two duplicate halves being severed after both halves have been completely machined by these same tools. Thus, by a single set of indexible parallelly located spindles or chucks and the usual single indexing thereof and a single set of tools cooperating with the work carried by these chucks and an alternately operative cut-off means effective to skip the work of every other spindle so as to cut the work in half only after both ends of the work have been completed, I am enabled to do the work on one machine instead of two or by the use of an auxiliary advancing and retracting chuck carrier and its necessary complicated mechanism and an additional set of tools. Thus, I accomplish the result by one and the same set of tools instead of two and cut the work in half only after both ends thereof have been completed instead of after the completion of only one end. Further, I am able to convert an ordinary six spindle machine, to accomplish the result, by using a very simple means so that by a single adjustable means, the cut-off means is operated so as to skip every other spindle so that it operates alternatively, or may be transformed by the manipulation of this single adjustable means back into an ordinary machine.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made or all of the modes of its use, I claim:

1. In a machine for chucking and machining a pair of articles from a single piece of substantially double size, a series of external chucks for gripping the ends of double sized pieces, tool means for completely machining the exposed portions thereof, a series of internal chucks alternately arranged with the external chucks and adapted to hold the machined portions of the pieces for operation on the unmachined portions thereof by the same tool means, an indexible carrier for said chucks, and alternately operative means for cutting in half the two complete finished pieces and operative only on the work carried by each alternate chuck.

2. A chucking machine having an indexible spindle carrier provided with a series of rotary external chucks and a series of rotary internal chucks alternately arranged, means for simultaneously machining the work gripped by both sets of chucks, cut-off mechanism operative on alternate indexing positions, and means for operating said cut-off mechanism and comprising a cam shaft, a cam drum loose thereon, an internal gear carried by said cam drum, a gear carried by said cam shaft, and an idler gear meshing with said gears and carried by a normally fixed part.

3. A chucking machine having an external chuck for gripping a piece of work, means for completely machining the exposed end thereof, an internal chuck for gripping the previously machined end of the piece of work upon its removal from the external chuck and the reversal thereof, and indexible spindle carrier for the chucks, said chucks being parallelly located whereby both ends of the piece of work are machined by the same tools, and means for cutting the piece of work in half and operative only on the work carried by the internal chuck.

4. A chucking machine having an indexible carrier provided with external chucks, each for gripping a piece of work, means for completely machining the exposed end thereof, internal chucks, each for gripping the previously machined end of the piece of work upon its removal from the external chuck and the reversal of the work whereby both ends of the piece of work are machined by the same tools, and means for cutting the piece of work in half, said chucks comprising two sets of chucks located in parallelism and alternately arranged, said cut-off mechanism operative on the work carried only by one set of the same form of chucks.

5. A chucking machine having an indexible carrier provided with external chucks, each for gripping a piece of work, means for completely machining the exposed end thereof, internal chucks, each for gripping the previously machined end of the piece of work upon its removal from the external chuck and the reversal of the work whereby both ends of the piece of work are machined by the same tools, means for cutting the piece of work in half, said chucks comprising two sets of chucks located in parallelism and alternately arranged, said cut-off mechanism operative on the work carried only by the internal chucks, and means for holding the cut-off mechanism out of operation on the work carried by the external chucks and for shifting it into position to operate on the work carried by the internal chucks.

6. A multiple spindle machine comprising an indexible spindle carrier having a series of rotary spindles, means carried by some of the spindles for holding one end of a piece of work, means also carried by some of the spindles for holding the opposite ends of the same pieces of work, side and end working tools for simultaneously operating on the pieces of work carried by all of the spindles, and alternately operating cut-off mechanism operative only on the work carried by every other spindle.

7. A multiple spindle machine comprising an indexible spindle carrier having a series of six rotary spindles, means carried by three of the spindles for holding the work exteriorly, means carried by the other three spindles for holding the work interiorly, said work holding means being alternately located, side and end working tools for simultaneously operating on the pieces of work carried by all of the spindles, and alternately operating cut-off mechanism operative only on the work carried by every other spindle.

8. A machine having an indexible spindle carrier having a plurality of spindles, means for simultaneously machining the work carried by the spindles, a cut-off mechanism, means for operating said cut-off mechanism, and means for regulating the operation of said cut-off mechanism whereby it may operate on the work carried by each spindle or alternately on the work of every other spindle.

9. A chucking machine having an indexible spindle carrier having a plurality of spindles and having a series of external and internal chucks alternately arranged, means for simultaneously machining the work carried by the chucks, a cut-off mechanism, rotary means for operating said cut-off mechanism, and means associated with said rotary means for regulating the operation of said cut-off mechanism whereby it may operate on the work carried by each chuck or alternately on the work of every other chuck.

10. A machine having an indexible spindle carrier having a plurality of spindles, means for simultaneously machining the work carried by the spindles, a cut-off mechanism, means for operating said cut-off mechanism, and means for regulating the operation of said cut-off mechanism whereby it may operate on the work carried by each spindle or alternately on the work of every other spindle and comprising a rotatable member or bracket associated with the cut-off operating means, means for normally holding it in a fixed position, and releasable means to permit it to rotate freely.

11. A machine for forming a pair of articles from a piece of work of substantially double size comprising means for externally holding the work and means for indexing it from one station to another, means for working on the exposed end of the work, internal holding means operate alternately with the external holding means for then holding the work internally for operation thereon by the same tools, and means for severing the articles after both ends have been completed and operative with alternate work holding means.

12. A machine for forming a pair of articles from a piece of work of substantially double size comprising means for holding the work externally and means for indexing it from one station to another, means for working on the exposed end of the work, means operative alternately with the external holding means for then holding the work internally for operation thereon by the same tools, means for cutting off the work after both ends have been completed and operative alternately with one of the work holding means, and means for throwing said cutting means into and out of alternate operation.

13. In a multiple spindle machine, the combination of an indexible spindle carrier, means for indexing it, a cutting off mechanism for cutting in half the two completely finished pieces, and means for operating said cutting mechanism whereby it will skip every other spindle and operate only as each alternate spindle arrives at the cutting position.

14. In a multiple spindle machine, the combination of an indexible spindle carrier, means for indexing it, a cutting mechanism, means for operating said cutting mechanism whereby it will skip every other spindle and operate only as each alternate spindle arrives at the cutting position, and means for releasing or resetting said operating means whereby the cutting mechanism will operate as each spindle arrives at the cutting position.

15. In a multiple spindle machine, the combination of an indexible spindle carrier, means for indexing it, a cutting mechanism comprising a slide adapted to carry a cutting tool, and rotary means for operating said cutting mechanism and means optionally operative to control said last means whereby the cutting mechanism will skip every other spindle and operate only as each alternate spindle or as each spindle arrives at the cutting position.

16. In a multiple spindle machine, the combination of an indexible spindle carrier, means for indexing it, a cutting mechanism, means for operating said cutting mechanism whereby it will skip every other spindle and operate only as each alternate spindle arrives at the cutting position, and means for releasing or resetting said operating means whereby the cutting mechanism will operate as each spindle arrives at the cutting position, and comprising a rotary gear carrying member, a cooperating gear carrying cam, and a releasable means for holding said rotatable member against rotation.

17. A chucking machine having an indexible spindle carrier provided with a series of work holding chucks, means for simultaneously machining the work gripped by said chucks, cut-off mechanism for cutting in half the two completely finished pieces, and means effective to operate said cut-off mechanism on alternate indexing of said carrier.

18. A chucking machine having an indexible spindle carrier provided with a series of work holding chucks, means for simultaneously machining the work gripped by said chucks, cut-off mechanism, and optionally operative means effective to operate said cut-off mechanism either on alternate indexing of said carrier or on each indexing thereof.

19. A chucking machine having an indexible spindle carrier provided with a series of rotary chucks, means for simultaneously machining the work gripped by said chucks, and a cut-off mechanism for cutting in half the two completely finished pieces and operative only on the work carried by alternate chucks.

20. A chucking machine having an indexible spindle carrier provided with a series of rotary chucks, means for simultaneously machining the work gripped by said chucks, a cut-off mechanism operative on alternate indexing positions, and means for operating said cut-off mechanism and comprising a cam shaft, a cam drum loose thereon, an internal gear carried by said cam drum, a gear carried by said cam shaft, and an idler gear meshing with said gears and carried by a normally fixed part.

21. A chucking machine having an indexible spindle carrier provided with a series of rotary chucks, means for simultaneously machining the work gripped by said chucks, a cut-off mechanism operative on alternate indexing positions, and means for operating said cut-off mechanism and comprising a cam shaft, a cam drum loose thereon, an internal gear carried by said cam drum, a gear carried by said cam shaft, an idler gear meshing with said gears and carried by a normally fixed part, and means for releasing said fixed part.

ALFRED E. DRISSNER.